Jan. 14, 1964  F. W. COLE  3,117,550
TEMPERATURE SENSITIVE DIFFERENTIAL
PRESSURE RESPONSIVE DEVICE
Filed March 20, 1961  2 Sheets-Sheet 1

INVENTOR.
FREDERIC W. COLE
BY
William N. Antonis
ATTORNEY

INVENTOR.
FREDERIC W. COLE
BY
William N. Antonis
ATTORNEY

United States Patent Office 3,117,550
Patented Jan. 14, 1964

3,117,550
TEMPERATURE SENSITIVE DIFFERENTIAL
PRESSURE RESPONSIVE DEVICE
Frederic W. Cole, Madison Heights, Mich., assignor to
The Bendix Corporation, a corporation of Delaware
Filed Mar. 20, 1961, Ser. No. 96,815
7 Claims. (Cl. 116—70)

This invention relates to temperature sensitive differential pressure responsive devices and more particularly to a temperature sensitive differential pressure indicating device for use in conjunction with a filter.

Differential pressure sensing devices are widely used in industry and in the filter industry in particular. Such devices normally sense changes in pressure drop across a filter element when the element becomes clogged and indicate in some manner or another that the filter element should be replaced. Since the viscosity of fluids increases greatly at low temperatures, and abnormally high pressure drops will occur across a filter element under such circumstances, even though the element is clean, many devices have utilized various types of temperature controlled mechanisms for preventing false indications at such low temperatures.

Accordingly, it is an object of this invention to provide a novel, simple differential pressure indicating device which will indicate a given differential pressure only at temperatures above a predetermined value.

Another object of this invention is to provide a small compact unitized temperature sensitive differential pressure indicating device which may be positioned within the filtering element so that it will not require additional space and will be immersed in the fluid being filtered in order to more accurately sense the temperature of the fluid.

A further object of this invention is to provide an indicator which will continue to indicate the clogged condition of the filter even after the apparatus with which the filter is associated has ceased to operate.

An important object of this invention is to provide a temperature sensitive differential pressure responsive device which includes an elastically unstable element capable of moving in a sudden, non-linear fashion when the differential pressure acting thereon exceeds a predetermined value and occurs at element temperatures above a predetermined value.

More particularly, it is an object of this invention to provide a temperature sensitive differential pressure responsive device which includes a bimetallic dished or convex disc element capable of inverting only when differential pressures across said disc rise above a predetermined value and occur at disc temperatures above a predetermined value.

A further object of this invention is to provide a sensing device which may consist of a spherically or conically dished bimetallic disc which is held and sealed along the periphery thereof so that when a net pressure is applied to the convex side of the disc, the center will move in a nearly linear fashion until a predetermined critical pressure is reached, at which point the disc will suddenly invert, that is, turn inside-out, with a snap-action which may be used to actuate an auxiliary mechanism for indication or control purposes.

A still further object of this invention is to provide a method of electrolytically polishing one or both surfaces of the bimetallic disc for increased sensitivity and accuracy.

Another object of this invention is to provide a readily observable temperature sensitive differential pressure indicating device which may be easily and inexpensively fabricated.

The above and other objects and features of the invention will become apparent from the following description of the mechanism taken in connection with the accompanying drawing which forms a part of this specification and in which.

Figure 1:
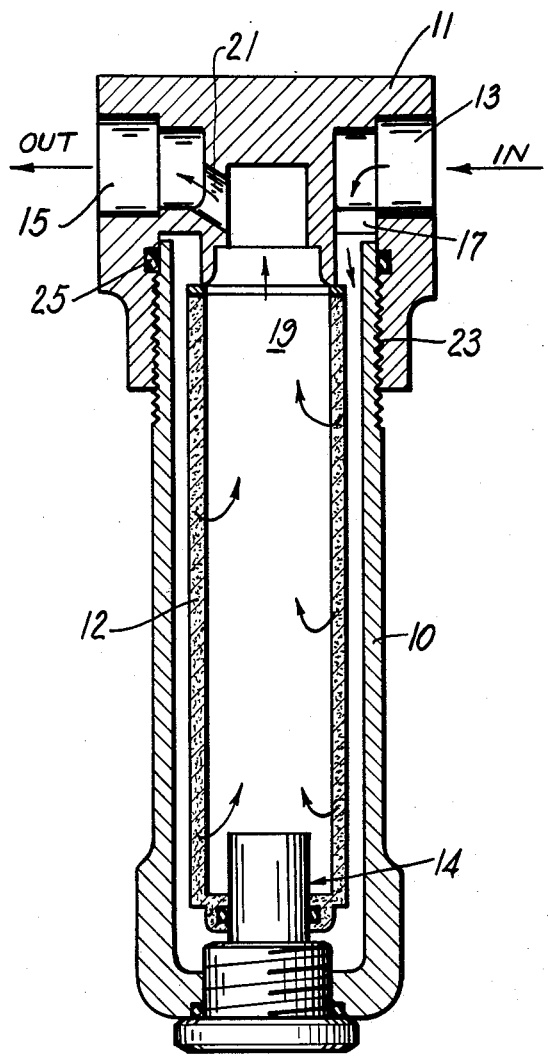
FIGURE 1 is a sectional view of a filter unit incorporating my filter clogging indicator.
Figure 2:
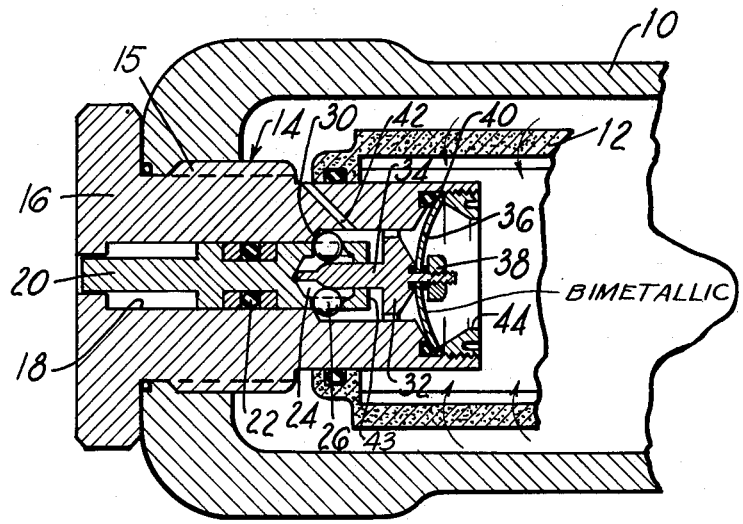
FIGURE 2 is an enlarged sectional view of my filter clogging indicator shown in conjunction with a portion of the filter unit.
Figure 3:
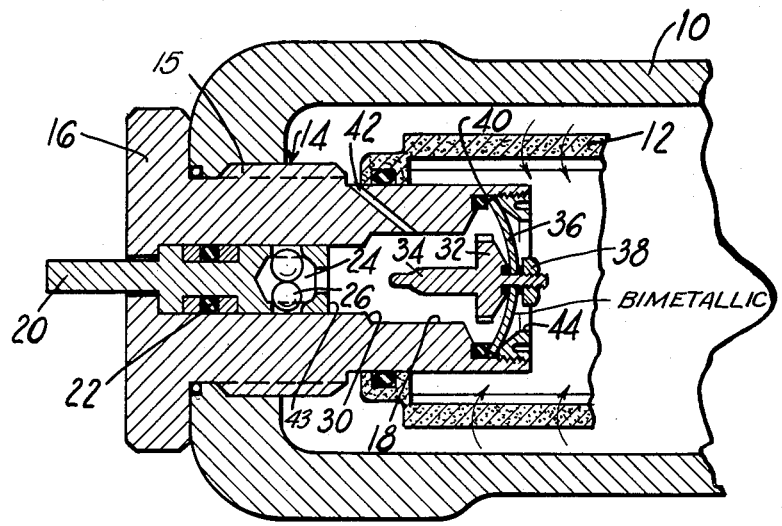
FIGURE 3 is an enlarged sectional view similar to that of FIGURE 1, except that the indicator is shown in a signalling position.

Referring to FIGURES 1–3, numeral 11 indicates a filter head having an inlet port 13 and an outlet port 15 which communicate with each other via passage 17, filter bowl 10, and passages 19 and 21 respectively. The bowl is secured in place to the lower side of head 11 by screw threads 23 and is sealed thereto in fluid-type relationship by an O-ring gasket 25. A suitable element 12 is disposed in the fluid bowl in such a manner that fluid flowing between the inlet port 13 and the outlet port 15 will flow therethrough, from the outside-in, as indicated by the arrows. Brackets (not shown) may be provided for mounting the device on an engine or other mechanism.

Located within the filter element 12 is a temperature sensitive differential pressure indicator assembly 14, which is threaded at 15 into the end of filter bowl 10. The indicator assembly includes a housing 16 having a step bore 18 therein which contains indicator pin 20. The indicator pin is slidable within step bore 18 and is movable from a hidden first position (nonsignalling position), as shown in FIGURE 1, to a visible second position (signalling position), as shown in FIGURE 2. A packing 22 is located between the indicator pin and step bore 18 for frictionally engaging and sealing the wall of said bore. Located within indicator pin 20 is a cavity 24 containing a plurality of balls 26 which protrude outside the cavity and contact a shoulder 30 formed on the wall of the bore. A guide member 32 has a trigger pin 34 extending therefrom and into the cavity 24 for maintaining the balls 26 in a protruding position which will result in abutment with shoulder 30 and prevent movement of the indicator pin 20 to a signalling position. The guide member 32 is operatively connected to a bimetallic convex disc 36 by suitable means such as jam nut 38. The disc is in effect a diaphragm which is suitably connected and sealed at its periphery 40 to the wall of the step bore 18. A first passage 42 communicates the convex side of the disc 36 and one end 43 of the indicator pin 20 with filter inlet pressure, while a second passage 44 communicates the concave side of the disc 36 with filter outlet pressure. Since two pressure sources are directed to the opposite sides of the disc 36, with the high pressure source communicating with the convex side of the disc, the resultant force will be in a direction tending to cause the disc to flatten in an almost linear fashion until a certain critical force is reached, at which time the disc will suddenly invert, that is, "turn inside-out," with considerable force and with a large relative motion of the center of the disc to which guide member 32 is attached.

By proper selection of design parameters such as diameter of the disc, shape and degree of dishing, thickness and elastic modulus of the disc material, and thickness ratios of the several metals, etc., the sensor disc may be made to invert at any desired pressure-temperature combination and to either stay inverted until manually reset, or to automatically reset itself when the actuation pressure is released.

Since the disc 36 is formed of a suitable bimetal it will be not only responsive to pressure, but will also be sensitive to temperatures. In other words, the inversion point of the disc will be a function of both temperature and pressure. As previously stated, most differential pressure indicators are designed to actuate when the pressure drop across the filter element exceeds some predetermined value, thus showing that the element is dirty and should be changed. When the fluid system is very cold, the viscosity of the fluid will be high and the pressure drop through a clean filter element may exceed this predetermined value. By utilizing a bimetallic step function disc as a sensing element, it will, in and of itself, compensate for the increased viscosity of the fluid at low temperatures since the pressure differential required for inversion of such a bimetallic disc is inversely proportional to the temperature and increases very rapidly at low temperatures. In this manner a bimetallic disc may be designed to invert only when differential pressures across said disc rise above a predetermined value and occur at disc temperatures above a predetermined value. If the temperatures are below a predetermined value the disc would not invert unless differential pressures of extremely higher magnitudes than normally anticipated in such systems would arise.

For most applications sufficient accuracy can be "built in" to the sensor disc by control of the design parameters. Where greater accuracy is required, the sensor disc may be "tuned" by electrolytic polishing of one or both surfaces. This is accomplished by fabricating the disc so that it will invert at a pressure slightly higher than the desired pressure. The disc is then made anodic in a suitable electrolyte which is applied to the convex surface of the disc at the exact pressure and temperature at which actuation is desired. Metal may then be anodically dissolved from the surfaces of the disc until the disc inverts at the pre-set electrolyte pressure and temperature, which may be closely measured and controlled, thus automatically stopping further metal dissolution by actuating a contactor or other device.

Operation of the indicator shown in FIGURES 1 and 2 will be as follows: Filter inlet pressure is communicated to the convex side of bimetallic disc 36 and filter outlet pressure is communicated to the concave side of the disc. At a predetermined pressure drop across the filter element, dependent on the temperature (viscosity) of the fluid, the disc 36 will suddenly and forcefully invert, thereby withdrawing the trigger pin 34 from the cavity 24. This permits the balls 26 to move completely within the cavity and the indicator pin, which has one end 43 pressurized by filter inlet pressure, is forced out to a visible or signalling position. The friction of the indicator pin packing 22 will hold the indicator pin in its visible position until the pin is manually reset. Since the sensor disc is a bimetallic element the disc will automatically compensate for variations in pressure drop due to fluid temperature (viscosity) and will actuate only as a function of non-temperature conditions such as dirt loading of the filter element.

Some of the advantages of my invention include basic simplicity, a minimum number of moving parts, compactness, ease of precise calibration, resistance to shock and vibration, and economy of manufacture. These and other practical advantages which flow from my temperature sensitive differential pressure responsive device are believed to be obvious from the above, and other advantages may suggest themselves to those who are familiar with the art to which this invention relates.

Furthermore, although my invention has been described in connection with a specific embodiment, it will be obvious to those skilled in the art that various changes may be made in the form, structure, and arrangement of parts without departing from the spirit of the invention. For example, the basic pressure sensing device, could be used in a variety of differential pressure indicator devices, automatic bypass valves, limit switches, and other mechanisms which depend on pressure and/or temperature changes for actuation. Accordingly, I do not desire to be limited to the specific embodiment disclosed herein primarily for purposes of illustration, but instead desire protection falling within the scope of the appended claims.

Having thus described the various features of the invention what I claim as new and desire to secure by Letters Patent is:

1. A temperature sensitive differential pressure indicating device comprising a housing having a bore therein, a shoulder formed on the wall of said bore, an indicator pin slidable in said bore and movable from a non-signalling to a signalling position, said indicator pin having a cavity formed therein, a plurality of balls partially located within said cavity and partially protruding therefrom for abutting said shoulder and preventing movement of said indicator pin to a signalling position, a trigger pin extending into said cavity for maintaining said balls in a protruding position for abutment with said shoulder, means for urging said indicator pin towards a signalling position, a bimetallic convex disc operatively connected at its periphery to the wall of said bore and at its center to said trigger pin for causing upon inversion of said disc movement of the trigger pin to a position which will permit the balls to move completely within said cavity, first passage means for communicating one side of said disc and one end of sad indicator pin with a first pressure source, and second passage means for communicating the other side of said disc with a second pressure source, said disc being caused to invert only when differential pressures across said disc rise above a predetermined value and occur at disc temperatures above a predetermined value.

2. A temperature sensitive differential pressure indicating device comprising a housing having a bore therein, an indicator element located in said bore and movable from a non-signalling to a signalling position, said indicator element having recess means formed thereon, restraining means located in said recess means for engaging the wall of said bore and preventing movement of said indicator element to a signalling position, trigger means operatively connected to said restraining means for maintaining said restraining means in engagement with the wall of said bore, means for urging said indicator element towards a signalling position, a temperature sensitive convex disc element operatively connected at its periphery to the wall of said bore and at its center to said trigger means for causing upon inversion of said disc element movement of the trigger means to a position which will permit said restraining means to become disengaged from the wall of said bore, first passage means for communicating one side of said disc element with a first pressure source, and second passage means for communicating the other side of said disc element with a second pressure source, said disc element being caused to invert only when differential pressures across said disc rise above a predetermined value and occur at disc temperatures above a predetermined value.

3. A temperature sensitive differential pressure indicating device comprising a housing having a bore therein, indicating means located in said bore and movable from a non-signalling to a signalling position, means for moving said indicating means towards said signalling position, restraining means having operative and inoperative positions operatively connected to said indicating means for preventing movement thereof to said signalling position, a temperature sensitive convex disc element operatively connected at its periphery to the wall of said bore and at its center to said restraining means for causing upon inversion of said disc element movement of said restraining means to an inoperative position, first passage means for communicating one side of said disc element with a first pressure source, and second passage means for communicating the other side of said disc element with a second pressure source, said disc element being caused to invert only when differential pressures across said disc rise above a predetermined value and occur at disc temperatures above a predetermined value.

4. A temperature sensitive differential pressure indicating device comprising indicating means movable from a non-signalling to a signalling position, means for moving said indicating means towards said signalling position, restraining means having operative and inoperative positions operatively connected to said indicating means for preventing movement thereof to a signalling position, a temperature sensitive convex disc element operatively supported at its periphery and having its center operatively connected to said restraining means for causing upon inversion of said disc element movement of said restraining means to an inoperative position, first passage means communicating one side of said disc element with a first pressure source, and second passage means for communicating the other side of said disc element with a second pressure source, said disc element being caused to invert only when differential pressures across said disc rise above a predetermined value and occur at disc temperatures above a predetermined value.

5. A temperature sensitive differential pressure indicating device comprising indicating means movable from a non-signalling to a signalling position, means for moving said indicating means towards said signalling position, restraining means having operative and inoperative positions operatively connected to said indicating means for preventing movement thereof to said signalling position, a temperature sensitive element having a first position for maintaining said restraining means in an operative position and a second position for causing movement of said restraining means to an inoperative position, first passage means for communicating one side of said element with a first pressure source, and second passage means for communicating the other side of said element with a second pressure source, said element being capable of moving from said first to said second position only when differential pressures acting across said element rise above a predetermined value and occur at element temperatures above a predetermined value.

6. A temperature sensitive differential pressure indicating device comprising a housing, indicating means located in said housing and movable from a non-signalling to a signalling position, means for urging said indicating means towards said signalling position, restraining means having operative and inoperative positions operatively connected to said indicating means for preventing movement thereof to said signalling position, said restraining means including a differential pressure sensing disc for causing movement of said restraining means to an inoperative position only when differential pressures above a predetermined value occur at temperatures above a predetermined value.

7. A temperature sensitive differential pressure indicating device comprising indicating means having signalling and non-signalling positions, means for urging said indicating means towards said signalling position, means for restraining movement of said indicating means from said non-signalling to said signalling position, and a temperature sensitive pressure responsive diaphragm operatively connected to said restraining means for releasing said indicating means from said restraining means only when the differential pressure acting on said diaphragm exceeds a predetermined value and occurs at diaphragm temperatures above a predetermined value.

References Cited in the file of this patent
UNITED STATES PATENTS

| | | |
|---|---|---|
| 2,660,143 | Simmons et al. | Nov. 24, 1953 |
| 2,935,040 | Steensen | May 3, 1960 |
| 2,979,021 | Scavuzzo | Apr. 11, 1961 |